W. E. DERRICK.
Horse Hay-Fork.

No. 85,733.   Patented Jan. 12, 1869.

Witnesses
Jas W Clark
Wm J Dodge

Inventor
Wm E Derrick
per F. W. Mosely & Co
Atty

United States Patent Office.

WILLIAM E. DERRICK, OF JORDAN, NEW YORK.

Letters Patent No. 85,733, dated January 12, 1869.

IMPROVEMENT IN HORSE HAY-FORKS.

The Schedule referred to in these Letters Patent and making part of the same.

*To all whom it may concern:*

Be it known that I, WILLIAM E. DERRICK, of Jordan, in the county of Onondaga, and State of New York, have invented a new and useful Improvement in Horse Hay-Forks; and I do hereby declare that the following is a full, clear, and exact description thereof, which will enable those skilled in the art to make and use the same, reference being had to the accompanying drawings, forming part of this specification, in which—

Figure 1:
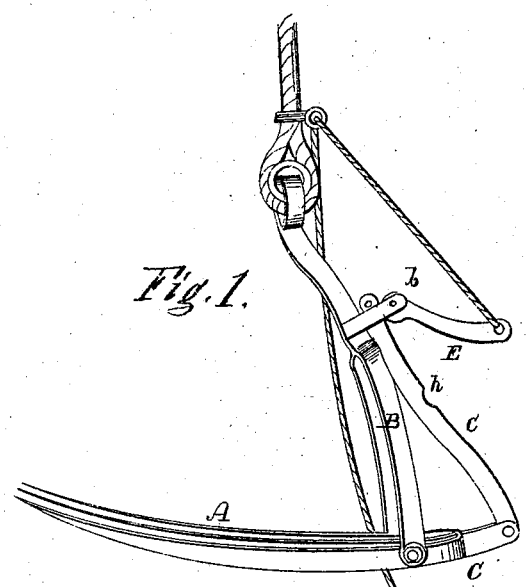
Figure 2:
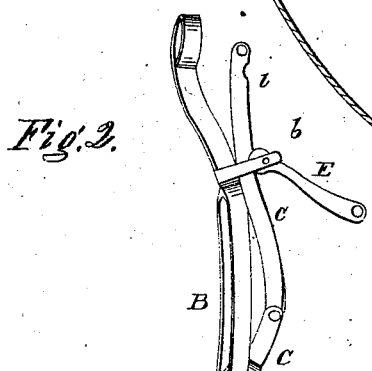

Figure 1 is a side view of my invention, showing the fork in the position for elevating its load, and Figure 2 is a like view, showing the fork in the discharging-position.

Similar letters of reference indicate like parts.

This invention consists in a fork, pivoted in a bail, having a jointed arm and cam-lever at its rear side or end, by which the fork is discharged, and whereby the bail is held rigidly when in the discharging-position, so as to serve as a handle for the operator to guide the fork when pressing it into the hay, as hereinafter more fully explained.

In the accompanying drawings—

A is the fork;

B is the bail;

C c, the jointed discharging-arm; and

E, the cam-lever.

The bail B is pivoted to each side of the fork, near its rear end or head, and behind the bail is a short arm, C, projecting to the rear, to which is jointed a vertical bar. c.

This bar c passes upward through a guide, b, on the upper part of the bail, and in the rear side of this guide is pivoted a cam-lever, E, for securing the bail rigidly in the elevating-position, as shown in fig. 1, and in the discharging-position, also, as seen in fig. 2.

In the upper end of the bar c is a notch, i, fig. 2, with which the cam-lever engages for the elevating-position of the bail, and near the centre of bar c is a second notch or depression, h, fig. 1, with which the cam-lever engages to hold the bail B rigidly in the discharging-position, so that the operator can use the bail as a fixed handle, to direct the fork when pressing it into the hay.

By this means I obtain a strong and simple discharging-device, and the loading of the fork is greatly facilitated.

Having thus described my invention,

What I claim as new, and desire to secure by Letters Patent, is—

The fork A, bail B, jointed arm C c, and cam-lever E, all constructed and operated as herein shown, and for the purpose set forth.

The above specification of my invention signed by me, this 22d day of October, 1868.

WILLIAM E. DERRICK.

Witnesses:
JAS. M. CLARK,
F. A. MORLEY.